US010859699B2

(12) United States Patent
Wind et al.

(10) Patent No.: US 10,859,699 B2
(45) Date of Patent: Dec. 8, 2020

(54) DETERMINING AXIAL LOCATION OF TIME OF ARRIVAL PROBE

(71) Applicant: UNITED TECHNOLOGIES CORPORATION, Farmington, CT (US)

(72) Inventors: Darren M. Wind, Glastonbury, CT (US); Eli Cole Warren, Wethersfield, CT (US); William W. Rice, South Glastonbury, CT (US); Sebastian Martinez, Middletown, CT (US); Charles Kniffin, Northford, CT (US); Corey A. Benoit, Uncaseville, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 825 days.

(21) Appl. No.: 15/642,664

(22) Filed: Jul. 6, 2017

(65) Prior Publication Data

US 2019/0011555 A1 Jan. 10, 2019

(51) Int. Cl.
| | |
|---|---|
| *G01C 3/08* | (2006.01) |
| *G01S 17/06* | (2006.01) |
| *G01B 11/27* | (2006.01) |
| *G01H 1/00* | (2006.01) |
| *G01B 11/14* | (2006.01) |
| *F01D 21/00* | (2006.01) |
| *G01B 11/26* | (2006.01) |

(52) U.S. Cl.
CPC ............ *G01S 17/06* (2013.01); *F01D 21/003* (2013.01); *G01B 11/14* (2013.01); *G01B 11/26* (2013.01); *G01B 11/272* (2013.01); *G01H 1/006* (2013.01); *F05D 2260/83* (2013.01); *F05D 2270/802* (2013.01); *F05D 2270/821* (2013.01)

(58) Field of Classification Search
CPC ....... G01B 11/14; G01B 11/272; G01B 11/26; F01D 21/003; G01H 1/006; G01S 17/06; F05D 2270/821; F05D 2270/802
USPC ...................................................... 356/5.01
See application file for complete search history.

(56) References Cited

U.S. PATENT DOCUMENTS

| | | | |
|---|---|---|---|
| 5,365,663 | A | 11/1994 | Demartini |
| 7,341,428 | B2 | 3/2008 | Twerdochlib |
| 7,836,772 | B2 | 11/2010 | Twerdochlib |
| 8,096,184 | B2 | 1/2012 | Twerdochlib |
| 9,068,906 | B2 * | 6/2015 | Silieti ............... F01D 5/32 |
| 2015/0199805 | A1 | 7/2015 | Hatcher, Jr. et al. |
| 2017/0003393 | A1 * | 1/2017 | Monks ............. G01B 11/306 |

OTHER PUBLICATIONS

European Patent Office, European Search Report dated Nov. 27, 2018 in Application No. 18181764.4.

* cited by examiner

*Primary Examiner* — Mark Hellner
(74) *Attorney, Agent, or Firm* — Snell & Wilmer L.L.P.

(57) ABSTRACT

An axial location of a time of arrival probe may be determined by attaching a wedge comprising a distal surface to a blade. A first edge of the distal surface and a second edge of the distal surface may form an angle. The axial location of the probe may be determined based on the angle and a distance extending from the first edge of the wedge to the blade.

20 Claims, 5 Drawing Sheets

DETERMINING AXIAL LOCATION OF TIME OF ARRIVAL PROBE

FIELD

The present disclosure relates generally to components of gas turbine engines and, more specifically, to time of arrival probes.

BACKGROUND

A non-interference stress measurement system (NSMS) may be designed for collecting structural data associated with gas turbine engine components (e.g., collecting rotating airfoil vibration measurements correlating to airfoil stress). The measured structural data may be used for engine design purposes, engine certification processes, and/or engine monitoring. A NSMS may utilize optical sensors within Time Of Arrival (TOA) probes, to collect said structural data in engine components. Current NSMS software may be able to account for circumferential misplacement of a TOA probe, but not for axial misplacement. If the TOA probe is axially misaligned, the reported deflection may be inaccurate, as the stress-to-deflection ratio for each mode of vibration is dependent on the axial location of the probe.

SUMMARY

A method of determining an axial location of a probe is disclosed, in accordance with various embodiments. The method may comprise attaching a wedge to a first blade. The wedge may comprising a distal surface. A first edge of the distal surface and a second edge of the distal surface may form an angle. The method may further comprise determining a first distance extending between the first edge of the wedge and the first blade, and determining the axial location of the probe using the angle and the first distance.

In various embodiments, the method may further comprise attaching the wedge to the first blade using a thermally releasable adhesive. The thermally releasable adhesive may be configured to release at a temperature greater than or equal to 100° F. In various embodiments, the wedge may comprise an internal cavity devoid of material. The angle formed by the first edge and the second edge may be between 10° and 80°. The wedge may comprise a material configured to melt at a temperature greater than or equal to 100° F.

In various embodiments, determining the first distance may comprise comparing a first time of arrival measurement taken while the wedge is attached to the first blade to a second time of arrival measurement taken after the wedge has been removed from the first blade.

In various embodiments, determining the first distance may comprise determining a first width extending from the first edge of the wedge to a surface of the first blade opposite the wedge, determining a second width extending from a second pressure side surface of a second blade to a second suction side surface of the second blade, and determining a difference between the first width and the second width. The first width may be determined by measuring a first time of arrival of the first edge of the wedge at the probe, and measuring a second time of arrival of the surface of the first blade at the probe. The surface of the first blade may comprise at least one of a first suction side surface of the first blade or a first pressure side surface of the first blade. The second width may be determined by measuring a third time of arrival of the second pressure side surface of the second blade at the probe, and measuring a fourth time of arrival of the second suction side surface of the second blade at the probe.

A method of making a time of arrival probe system is disclosed, in accordance with various embodiments. The method may comprise mounting a time of arrival probe to a rotor casing, attaching a wedge to a blade, and determining an axial location of the time of arrival probe. The wedge may comprise a distal surface. A first edge of the distal surface and a second edge of the distal surface may form an angle;

In various embodiments, the method may further comprise adjusting the axial location of at least one of the time of arrival probe or a laser beam of the time of arrival probe. The method may further comprise determining a correction factor for analyzing data output from the time of arrival probe using the axial location of the time of arrival probe.

In various embodiments, determining the axial location of the time of arrival probe may comprise determining a first distance extending from the first edge of the wedge and the blade, and calculating the axial location of the time of arrival probe using the first distance and the angle. The angle may be between 10° and 800. The method may further comprise attaching the wedge to the blade using a thermally releasable adhesive. In various embodiments, the wedge may comprise a material configured to melt at a temperature greater than or equal to 100° F.

In various embodiments, determining the axial location of the time of arrival probe may comprise determining a width of the blade while the wedge is attached to the blade using a pulse width measurement, and finding the axial location of the time of arrival probe in a lookup table using the width of the blade. The width of the blade may extend from the first edge of the wedge to a surface of the blade opposite the wedge. The pulse width measurement may comprise a difference between an arriving edge trigger logic measured at a first time and a departing edge trigger logic measured at a second time. The lookup table may correlate the width of the blade to a distance from at least one of a leading edge of the blade or a trailing edge of the blade.

A time of arrival probe system is disclosed, in accordance with various embodiments. A time of arrival probe system may comprise a rotor assembly comprising a plurality of blades. A wedge may be attached to a first blade of a the plurality of blades. A rotor casing may be disposed around the plurality of blades. A time of arrival probe may be mounted to the rotor casing.

In various embodiments, the wedge may comprise an internal cavity devoid of material. The wedge may comprise an opaque material.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

As used herein, "aft" refers to the direction associated with the tail (i.e., the back end) of an aircraft, or generally, to the direction of exhaust of the gas turbine engine. As used herein, "forward" refers to the direction associated with the nose (i.e., the front end) of an aircraft, or generally, to the direction associated with the intake of a gas turbine engine. As used herein, "distal" refers to the direction outward, or generally, away from a reference component. As used herein, "proximal" and/or "proximate" refers to a direction inward, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Figure 1:
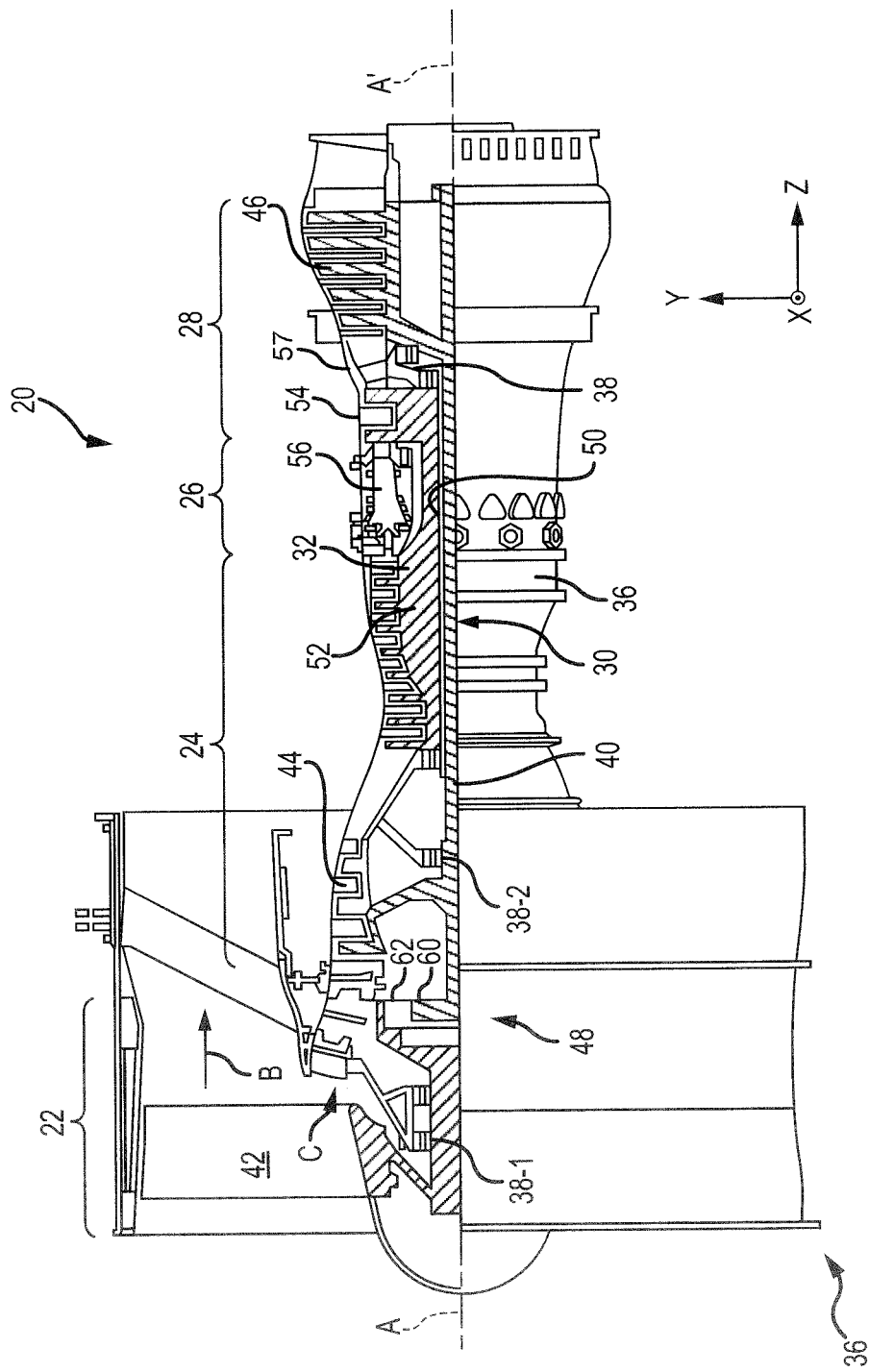
FIG. 1 illustrates a cross-section view of an exemplary gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26, and a turbine section 28. Alternative engines may include, for example, an augmentor section among other systems or features. In operation, fan section 22 can drive fluid (e.g., air) along a path of bypass airflow B while compressor section 24 can drive fluid along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan 42 structure. High speed spool 32 may comprise an outer shaft 50 that interconnects a high pressure compressor 52 and high pressure turbine 54. As used herein, a "high pressure" compressor or turbine experiences a higher pressure than a corresponding "low pressure" compressor or turbine.

A combustor 56 may be located between high pressure compressor 52 and high pressure turbine 54. A mid-turbine frame 57 of engine casing structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. The fan section 22, the compressor section 24, and the turbine section 28 may each comprise rotor systems including blade assemblies having one or more sets of rotating blades, which may rotate about engine central longitudinal axis A-A'.

Figure 2B:
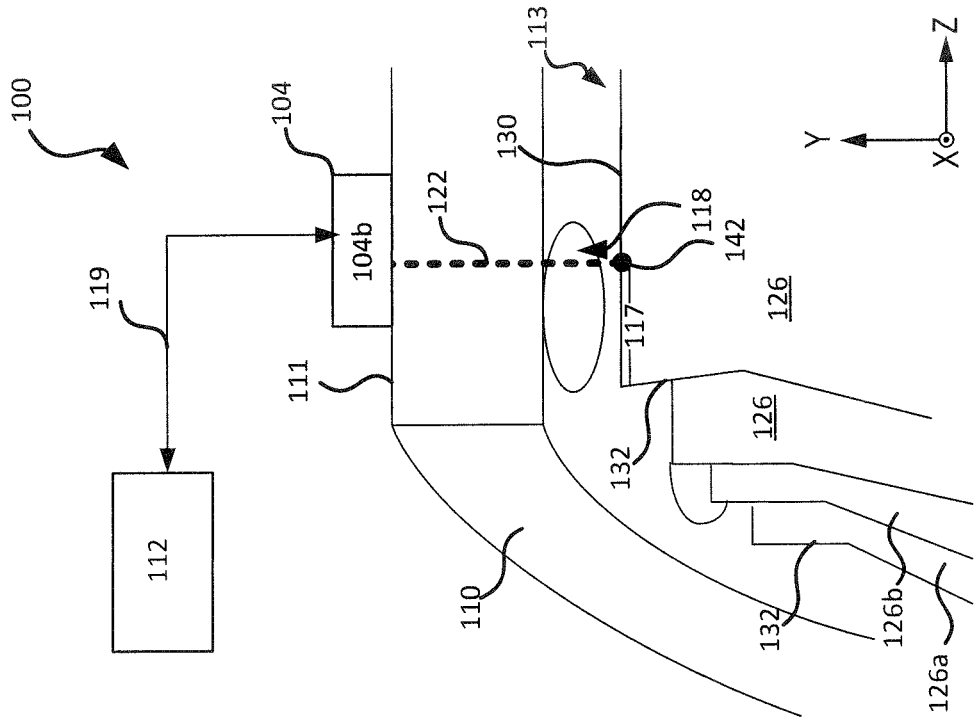
FIGS. 2A and 2B illustrate probes of a time of arrival probe system at varying axially positions, in accordance with various embodiments.
Figure 2A:
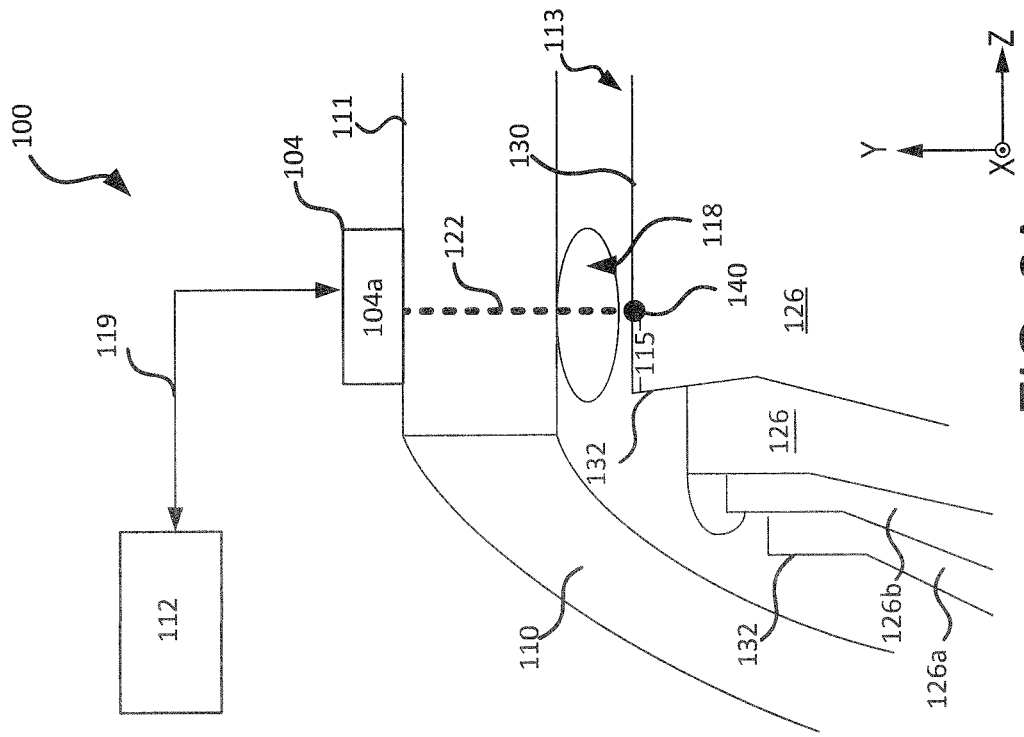

Referring to FIGS. 2A and 2B, a time of arrival probe system 100 is shown, in accordance with various embodiments. System 100 may comprise one or more time of arrival probes 104 mounted circumferentially to an outer surface 111 of a rotor casing 110. Rotor casing 110 may be configured as a cylindrical shroud and may be disposed concentric to a rotor assembly 113 comprising a plurality of rotating blades 126. In various embodiments, probes 104 may be mounted on a radially outward surface of a blade outer air seal (BOAS) disposed around blades 126. Probes 104 may each include a laser assembly configured to emit a beam of light 122 (also referred to as a laser beam) through an opening 118 in rotor casing 110. Probes 104 may be configured to project laser beam 122 at a target located on a radially outward tip 130 of blades 126.

System 100 may further include a controller 112 in operable communication with probes 104. Communication channels 119 may connect the controller 112 to probes 104. Controller 112 of system 100 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Controller 112 may comprise system program instructions and/or controller instructions that may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In that regard, controller 112 may be configured to determine the time of arrival of each blade 126 at each probe 104 of system 100. In various embodiments, controller 112 may be part of a Non-interference Stress Measurement System (NSMS) configured to collect structural data associated with components of gas turbine engine 20 (FIG. 1) using time of arrival data output from probes 104.

In various embodiments, one or more of the probes 104 of system 100 may be axially misaligned. For example, a first probe 104a (FIG. 2A) may be mounted at a different axial location (in the z-direction) as compared to a second probe 104b (FIG. 2B). Laser beam 122 from first probe 104a may contact a location 140 on tip 130 of blade 126 that is a distance 115 from leading edge 132. Laser beam 122 from second probe 104b may contact a location 142 on tip 130 that is a distance 117 from leading edge 132. Axial misalignment of second probe 104b may cause distance 117 to be less than or greater than distance 115. The difference in axial distance between leading edge 132 and location 140 and leading edge 132 and location 142 may lead to inaccurate data analysis, as the stress-to-deflection ratio used to analyze each mode of vibration is blade location specific. Stated another way, data models employing data output from an axially misaligned probe may not accurately reflect, for example, fatigue of blades 126 and/or health of engine 20 (FIG. 1), as the stress-to-deflection ratio used by the data model changes relative to where axially on the blade the data output is generated.

In various embodiments, and as discussed in further detail below, a triangular shaped component or "wedge," may be bonded, or otherwise attached, to one of the blades 126 of rotor assembly 113. The attached wedge may affect the width of blade by distance D (FIG. 3) (as measured along the x-axis) and the time of arrival measurements associated with the blade having the wedge. The affected time of arrival measurements may be used to determine a distance of each laser beam 122/probe 104 from leading edge 132. Thus, an axial location along the z-axis of each laser beam 122/probe 104 of system 100 may be determined.

Knowing the axial location of each laser/probe may allow for more accurate analysis of conditions relating to blades 126. For example, the signal generated from the blade having the wedge may be used for indexing or for correlating blade specific vibration to other data sources, such as telemetry based strain gauges. In various embodiments, upon determining the axial location of each probe 104, one or more of the probes 104 and/or laser beams 122 may be adjusted (i.e., have their axial position changed) to correct any misalignment. In various embodiments, the determined misalignment of a probe 104 may be taken into account when analyzing the time of arrival measurements output from the misaligned probe. For example, controller 112 may use the axial location of a probe to determine a correction factor, or correction algorithm, for adjusting the data output from the misaligned probe and/or for adjusting the data model used to analyze blades 126 and/or engine 20 (FIG. 1). In various embodiments, controller 112 may use the difference between the intended axial location of a probe and the actual axial location of the probe (i.e., the measured axial misalignment) to determine an accuracy, or error factor, of the data model used to analyze blades 126 and/or engine 20 (FIG. 1).

Figure 3:
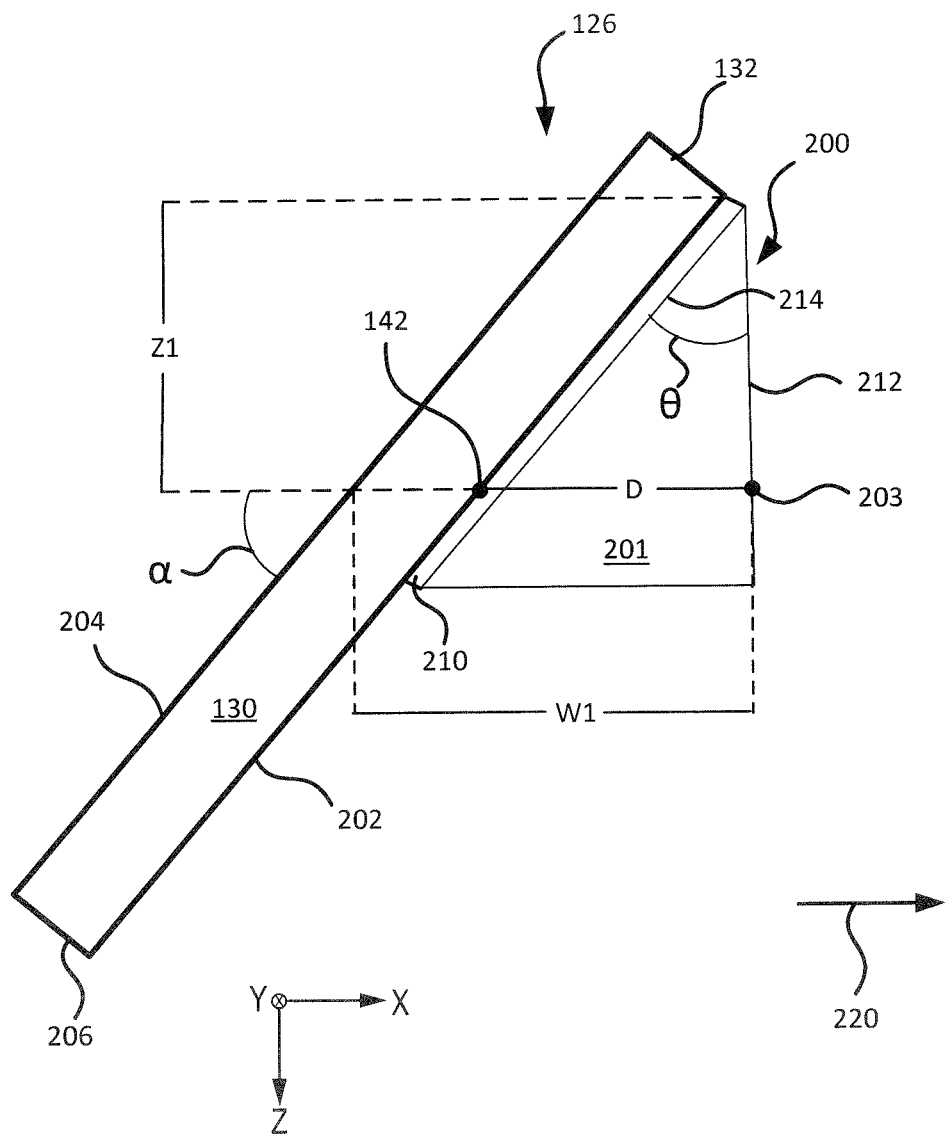
FIG. 3 illustrates a wedge coupled to a blade, in accordance with various embodiments.

FIG. 3 shows a radially inward looking view of a blade 126 having a wedge 200 coupled to a pressure side surface 202 of the blade. Blade 126 may have a leading edge 132 opposite a trailing edge 206. Although shown as planar surfaces for simplicity in FIG. 3, in various embodiments, blade 126 may include a generally concave pressure side surface 202 and a generally convex suction side surface 204 (also referred to as departing edge 204) joined together at the respective leading edge 132 and trailing edge 206 of blade 126. Wedge 200 may be coupled to pressure side surface 202 of blade 126 proximate leading edge 132. While wedge 200 in FIG. 3 is located proximate leading edge 132, it should be understood that wedge 200 may be located any distance from leading edge 132. The location of wedge 200 may be selected to complement the intended location of the time of arrival probes. For example, if the probes are configured to monitor an area proximate to trailing edge 206, then wedge 200 may be disposed proximate to trailing edge 206.

Wedge 200 may include a distal surface 201 oriented toward probe 104 (FIG. 2A). A first edge 212 (also referred to as an arriving edge) and a second edge 214 of distal surface 201 may form an angle theta (θ). In various embodiments, angle θ may be between 100 and 80°. In various embodiments, angle θ may be between 250 and 60°. In various embodiments, angle θ may be between 35° and 50°. An adhesive 210 may bond wedge 200 to pressure side 202 of blade 126. During operation of engine 20 (FIG. 1), wedge 200 may release, or otherwise be removed, from blade 126. In various embodiments, adhesive 210 may be a thermally releasable adhesive configured to release, or cease to adhere, at or above a pre-determined temperature. In various embodiments, adhesive 210 may be configured to release at a temperature greater than or equal to 100° F. (38° C.). In various embodiments, adhesive 210 may be configured to release at a temperature greater than or equal to 200° F. (93° C.).

With combined reference to FIG. 2B and FIG. 3, the geometry of wedge 200 may be used to calculate an axial location of each probe 104 of system 100. As blade 126 rotates in the direction of arrow 220 about engine central longitudinal axis A-A' (FIG. 1), edge 212 of wedge 200 will arrive at each probe 104 of system 100 prior to pressure side 202 arriving at the probe. The time of arrival of blade 126 with wedge 200 attached may be measured at the time arriving edge 212 reaches the probe 104. After wedge 200 is removed from blade 126, either by a release of adhesive 210 or a melting of wedge 200, the time of arrival of blade 126 may be measured when pressure side surface 202 arrives at the probe. Controller 112 may have instructions stored thereon which allow controller 112 to determine a distance D between a point 203 where laser beam 122 contact edge 212 of wedge 200 and blade 126. Controller 112 may determine distance D using the change between the time of arrival of blade 126 while wedge 200 is attached and the time of arrival of blade 126 after wedge 200 is removed. In various embodiments, distance D may be determined by analyzing NSMS stack plots illustrating the difference between the time of arrival of blade 126 while wedge 200 is attached and the time of arrival of blade 126 after wedge 200 is removed. For example, a first NSMS stack plot may illustrate that a blade has an 0.080 inches (0.20 cm) from nominal arrival time and a second NSMS stack plot generated later in time (i.e., after the wedge is removed from the blade) illustrates the same blade has a 0.036 inches (0.09 cm) from nominal time of arrival. The change in time of arrival data from 0.08 inches to 0.036 inches indicates that that blade had the wedge attached when the data for the first stack plot was generated and that distance D1 is 0.044 inches (0.11 cm).

In various embodiments, distance D may be determined by comparing a width W1 of the blade having wedge 200 attached to a width of the next similar blade that does not have a wedge attached. For example, with combined reference to FIG. 3 and FIG. 2B, wedge 200 may be attached to a first blade 126a. A width W1 of the first blade 126a extending from the point 203 where laser 122 contacts edge 212 of wedge 200 to suction side surface 204 may be determined using a time of arrival of edge 212 at probe 104a and a time of arrival of suction side surface 204 at probe 104a. A width of a second blade 126b, which is similar to first blade 126a, but does not have a wedge attached, may be determined using a time of arrival of pressure side 202 of second blade 126b at probe 104a and a time of arrival of suction side surface 204 of second blade 126b at probe 104a. Distance D may be calculated by subtracting the width of the second blade 126b from the width W1 of the first blade 126a measured with wedge 200 attached.

After determining distance D, the known geometry of blade 126 and the known geometry of wedge 200 may be used to determine an axial location of the probe relative to blade 126. In various embodiments, after determining distance D1, an axial distance Z1 between the leading edge 132 of blade 126 and the location 142 where laser beam 122 contacts blade 126 may be determined using the equation:

$$Z1 = D * \sin(\alpha)/\sin(\theta) * (\sin(\alpha+\theta))$$

α=90°—a chord angle of blade 126, wherein the chord angle of blade 126 is measured relative to the engine central longitudinal axis A-A' of FIG. 1

θ=wedge angle

Using the above equation and the known angle θ of wedge 200, the axial distance Z1 (i.e., distance 117) between the location 142 where laser beam 122 contacts tip 130 and leading edge 132 of blade 126 can be determined. In various embodiments, axial distance Z1 may be determined by employing a lookup table that correlates widths W1 of blade 126 measured with wedge 200 attached, (i.e., widths extending from edge 212 of wedge 200 to suction side surface 204) to axial locations of the probe (i.e., to Z distances). For example, at the time the wedge is bonded, or otherwise attached, to the blade, a lookup table may be created by measuring the various widths W1 of blade 126 with wedge 200 attached and the axial distances Z1 that correlate to each width W1. During operation of engine 20 (FIG. 1), a pulse width of blade 126 with wedge 200 attached is measured to determine the width W1, at the point 203 where laser 122 (FIG. 2A) contacts blade 126. The pulse width may comprise a difference between an arriving edge (e.g., edge 212 of wedge 200) trigger logic measured at a first time and a departing edge (e.g., suction side 204) trigger logic measured at a second time on the same blade 126. The measured pulse width, which correlates to width W1, may then be employed to lookup the axial location of the probe 104 in the lookup table. In various embodiments, the pulse width measurement and lookup table may be employed to determine an accuracy of an axial distance Z1 calculated using distance D and angle θ. Stated differently, the measured lookup table values of width W1 and axial distances Z1 may be compared to the axial distance Z1 calculated using a distance D that was determined based on a difference in time of arrival measurements for a blade with wedge 200 and without wedge 200.

Knowing the axial location of the laser beam 122 contact point for each probe 104 of system 100 may allow for more accurate analysis of conditions relating to blades 126. In various embodiments, upon determining the axial location of each probe 104, probes 104 and/or laser beams 122 may be adjusted (i.e., changed in axial position) to correct or remove any axial misalignments. In various embodiments, the determined misalignment may be taken into account when analyzing the time of arrival measurements in order to calibrate the system 100. For example, the axial location of a probe may determine a correction factor, or correction algorithm, for adjusting the data model used to analyze blades 126 and/or engine 20 (FIG. 1). The axial location of a probe may also determine an accuracy, or error factor, of the data model used to analyze blades 126 and/or engine 20 (FIG. 1).

Figure 4A:
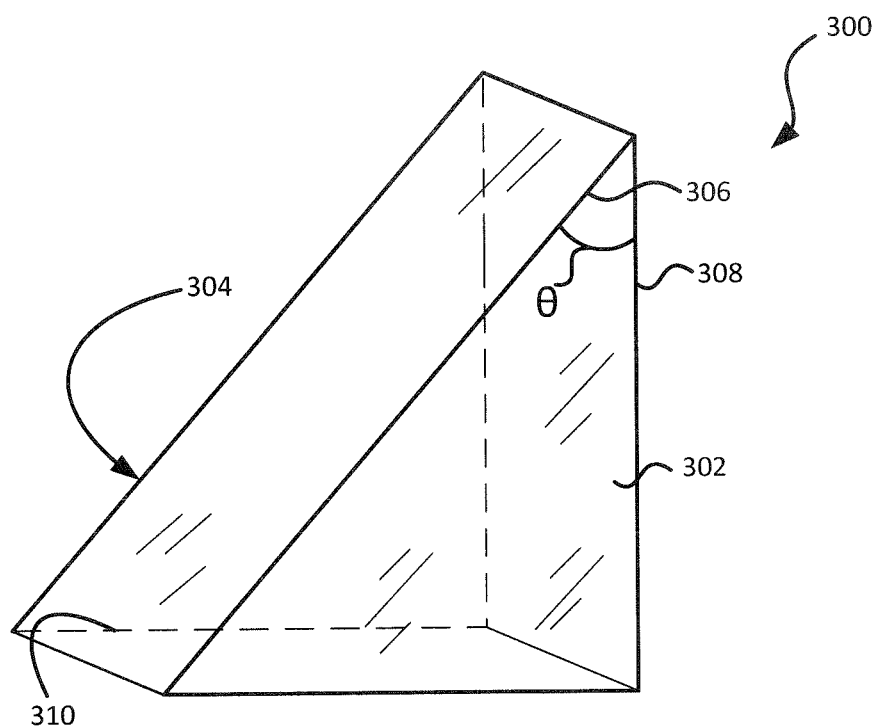
FIGS. 4A and 4B, illustrates a perspective view of a wedge, in accordance with various embodiments.

FIG. 4A illustrates a perspective view of a wedge 300 which may be coupled to a blade, in accordance with various embodiments. Wedge 300 may include opposing triangular surfaces, including distal surface 302 and proximal surface 304. A first edge 306 and second edge 308 of distal surface 302 may be formed at an angle theta (θ). In various embodiments, angle θ may be between 10° and 80°. In various embodiments, angle θ may be between 25° and 60°. In various embodiments, angle θ may be between 35° and 50°. A first surface 310 of wedge 300 may extend between distal surface 302 and proximal surface 304.

With combined reference to FIG. 4A and FIG. 3, first surface 310 of wedge 300 may be bonded to pressure side surface 202 of blade 126. A contour of first surface 310 may be configured to mirror or complement the contour of pressure side surface 202 of blade 126. In various embodiments, first surface 310 may be bonded to suction side surface 204 of blade 126. A contour of first surface 310 may be configured to mirror or complement the contour of suction side surface 204 of blade 126. Wedge 300 may be bonded, or otherwise attached, to blade 126 with distal surface 302 oriented radially outward (i.e., oriented toward laser beam 122 of FIG. 2A).

Figure 4B:
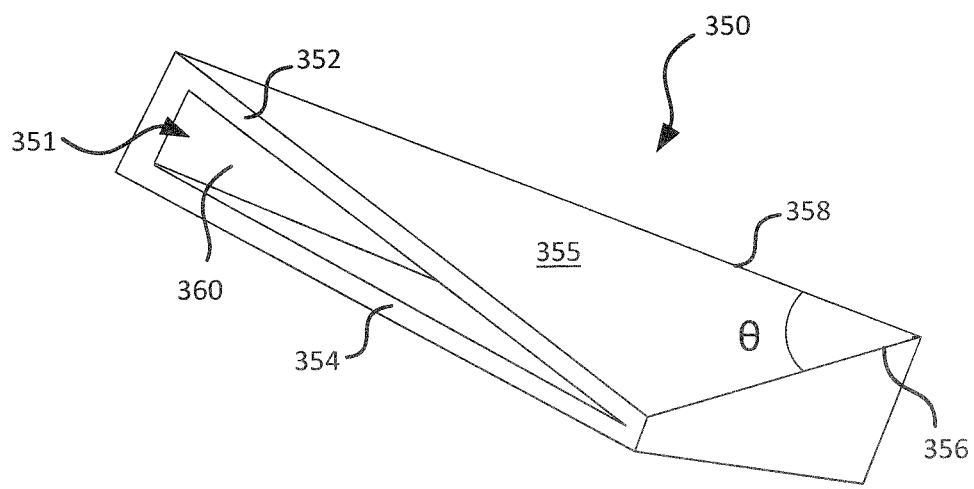

FIG. 4B illustrates a perspective view of a wedge 350 which may be coupled to a blade, in accordance with various embodiments. Wedge 350 may comprise opposing triangular walls, including distal wall 352 and proximal wall 354. In various embodiments, distal wall 352 may be angled with respect to proximal wall 354. Stated another way, distal wall 352 may be non-parallel to proximal wall 354. A radially outward, or distal, surface 355 of distal wall 352 may include a first edge 356 and a second edge 358. First edge 356 and second edge 358 may be formed at angle θ. In various embodiments, angle θ may be between 10° and 80°. In various embodiments, angle θ may be between 25° and 60°. In various embodiments, angle θ may be between 35° and 50°. A blade connect wall 360 may extend between distal wall 352 and proximal wall 354. With combined reference to FIG. 4B and FIG. 3, wall 360 may be bonded to pressure side surface 202 of blade 126. In various embodiments, a contour of wall 360 may be configured to mirror or complement pressure side surface 202 of blade 126. In various embodiments, wall 360 may be bonded to suction side surface 204 of blade 126. In various embodiments, a contour of wall 360 may be configured to mirror or complement suction side surface 204. Wedge 350 may be coupled to blade 126 with surface 355 of distal wall 352 oriented radially outward (i.e., oriented toward laser beam 122 of FIG. 2A).

In various embodiments, wedge 350 may be hollow. Stated differently, the walls of wedge 350 may partially define an internal cavity 351 that may be devoid of material. Cavity 351 may reduce a weight and/or mass of wedge 350. Cavity 351 may increase a brittleness of wedge 350. Stated differently, the walls of wedge 350 may be made sufficiently thin so as to easily fracture or break apart after release of wedge 350 from blade 126. Increasing a brittleness or breakability of wedge 350 may generally prevent wedge 350 from damaging downstream hardware or affecting performance of gas turbine engine 20 (FIG. 1).

Wedge 350 may be formed by injection molding, stamping, casting, machining, additive manufacturing, or other suitable manufacturing process. In various embodiments, wedge 350 may be formed by an additive manufacturing technique such as direct metal laser sintering, selective laser sintering, selective laser melting, electron-beam melting, or electron-beam freeform fabrication. A material of wedge 350 may be opaque. An opaque material may allow probes 104 (FIG. 2A) to better sense and/or recognize wedge 350 when attached to a blade 126. In various embodiments, wedge 350 may comprise a material configured to melt at or above a particular temperature. For example, wedge 350 may be configured to melt at temperatures greater than or equal to 100° F. (38° C.). In various embodiments, wedge 350 may be configured to melt at temperatures greater than or equal to 200° F. (93° C.). Removing wedge 350 from the blade by melting wedge 300, 350, may prevent wedge 300 from damaging downstream hardware or otherwise affecting performance of gas turbine engine 20 (FIG. 1). Wedge 300 (FIG. 4A) may be formed in a manner similar to wedge 350 and may comprise materials similar to wedge 350.

Figure 5:
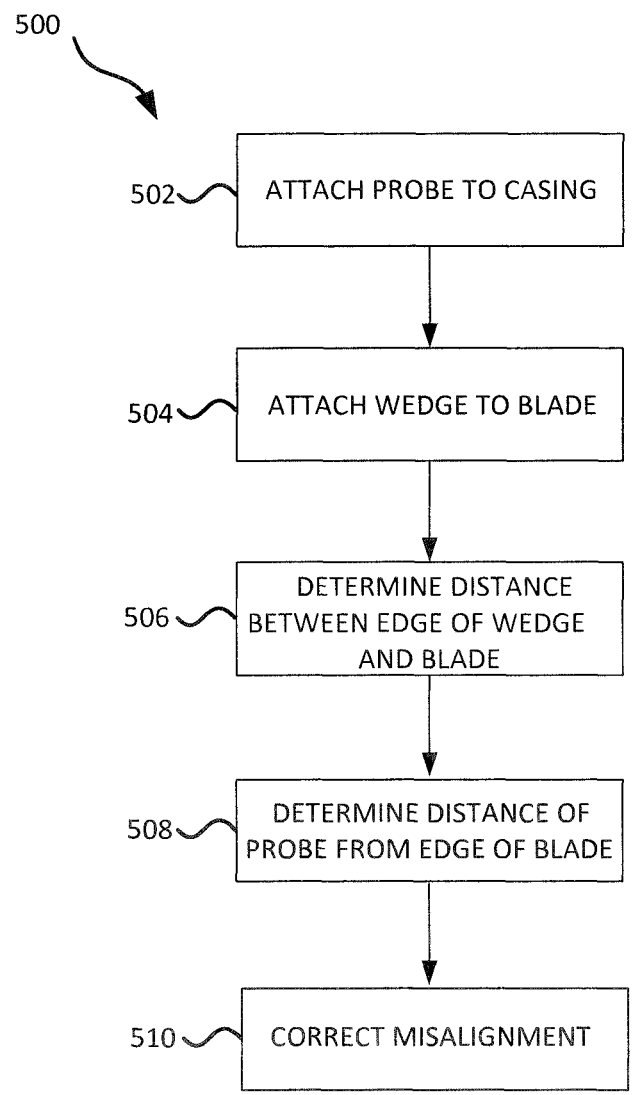
FIG. 5 illustrates a method of determining an axial location of a time of arrival probe, in accordance with various embodiments.

FIG. 5 illustrates a method 500 determining an axial location of a probe. Method 500 may comprise attaching the probe to a rotor casing (step 502), attaching a wedge to a blade (step 504), determining a distance between a first edge of the wedge and the blade (step 506), determining a distance of the probe from at least one of a leading edge of the blade or a trailing edge of the blade (step 508), and correcting for axial misalignment of the probe (step 510).

With combined reference to FIG. 5. FIG. 2B, and FIG. 3, step 502 may include attaching a probe 104 to rotor casing 110. Step 504 may include attaching a wedge 200 to a blade 126. Wedge 200 may be attached to a pressure side surface 202 or a suction side 204 of blade 126. In various embodiments, wedge 200 may be attached to blade 126 using a thermally releasable adhesive 210. Step 506 may include determining a distance D between first edge 212 of wedge 200 and blade 126. In various embodiments, distance D may be determined by comparing a first time of arrival measurement taken while wedge 200 is attached to blade 126 to a second time of arrival measurement taken after wedge 200 has been removed blade 126. In various embodiments, distance D may be determined by comparing a width W1 of a first blade 126a having a wedge 200 to a width of a second blade 126b without a wedge.

Step 508 may include determining a distance of probe 104 from at least one of leading edge 132 of blade 126 or trailing edge 206 of blade 126. In various embodiments, step 508 may include using the distance D1 determined in step 506 and the known geometry of wedge 200 and blade 126 to determine an axial location of probe 104 relative to blade 126. In various embodiments, step 508 may include determining the axial distance Z1 of probe 104 from leading edge 132 (i.e., the axial location of probe 104) using angle θ and distance D. In various embodiments, the axial location of probe 104 may be determined by measuring a pulse width of blade 126 with wedge 200 attached and finding the measured pulse width in a lookup table that correlates various widths W1 of blade 126 with wedge 200 attached to axial distances Z1 (e.g., distances from leading edge 132).

Step 510 may include correcting for axial misalignment of a probe 104. In various embodiments, correcting for probe misalignment may include adjusting a location of probe 104 or a laser beam 122 of probe 104. In various embodiments, correcting for probe misalignment may include determining, by controller 112, a correction factor, or correction algorithm, to apply to data output from the misaligned probe to adjust the data model used to analyze blades 126 and/or engine 20 (FIG. 1). In various embodiments, correcting for probe misalignment may include determining, by controller 112, an accuracy, or error factor, of the data model used to analyze blades 126 and/or engine 20 (FIG. 1).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of determining an axial location of a probe, comprising:
    attaching a wedge to a first blade, the wedge comprising a distal surface, wherein a first edge of the distal surface and a second edge of the distal surface form an angle;
    determining a first distance extending between the first edge of the wedge and the first blade; and
    determining the axial location of the probe using the angle and the first distance.

2. The method of claim 1, wherein the angle is between 10° and 80°.

3. The method of claim 1, further comprising attaching the wedge to the first blade using a thermally releasable adhesive.

4. The method of claim 3, wherein the thermally releasable adhesive is configured to release at a temperature greater than or equal to 100° F.

5. The method of claim 1, wherein the wedge comprises an internal cavity devoid of material.

6. The method of claim 1, wherein the wedge comprises a material configured to melt at a temperature greater than or equal to 100° F.

7. The method of claim 1, wherein the determining the first distance comprises comparing a first time of arrival measurement taken while the wedge is attached to the first blade to a second time of arrival measurement taken after the wedge has been removed from the first blade.

8. The method of claim 1, wherein the determining the first distance comprises:
    determining a first width extending from the first edge of the wedge to a surface of the first blade opposite the wedge, wherein the surface of the first blade comprises at least one of a first suction side surface of the first blade or a first pressure side surface of the first blade;
    determining a second width extending from a second pressure side surface of a second blade and a second suction side surface of the second blade; and
    determining a difference between the first width and the second width.

9. The method of claim 8, wherein the determining the first width comprises:
    measuring a first time of arrival of the first edge of the wedge at the probe, and
    measuring a second time of arrival of the surface of the first blade at the probe; and wherein the determining the second width comprises:
    measuring a third time of arrival of the second pressure side surface of the second blade at the probe, and
    measuring a fourth time of arrival of the second suction side surface of the second blade at the probe.

10. A method of making a time of arrival probe system, comprising:
    mounting a time of arrival probe to a rotor casing;
    attaching a wedge to a blade, the wedge comprising a distal surface, wherein a first edge of the distal surface and a second edge of the distal surface form an angle; and
    determining an axial location of the time of arrival probe.

11. The method of claim 10, further comprising adjusting the axial location of at least one of the time of arrival probe or a laser beam of the time of arrival probe.

12. The method of claim 10, further comprising determining a correction factor for analyzing data output from the time of arrival probe using the axial location of the time of arrival probe.

13. The method of claim 10, wherein the angle is between 10° and 80°.

14. The method of claim 10, wherein the determining the axial location of the time of arrival probe comprises:
    determining a first distance extending from the first edge of the wedge to the blade; and
    calculating the axial location of the time of arrival probe using the first distance and the angle.

15. The method of claim 10, further comprising attaching the wedge to the blade using a thermally releasable adhesive.

16. The method of claim 10, wherein the determining the axial location of the time of arrival probe comprises:
    determining a width of the blade while the wedge is attached to the blade using a pulse width measurement, wherein the width of the blade extends from the first edge of the wedge to a surface of the blade opposite the wedge, and wherein the pulse width measurement comprises a difference between an arriving edge trigger logic measured at a first time and a departing edge trigger logic measured at a second time; and
    finding the axial location of the time of arrival probe in a lookup table using the width of the blade, wherein the lookup table correlates the width of the blade to a distance from at least one of a leading edge of the blade or a trailing edge of the blade.

17. The method of claim 10, wherein the wedge comprises a material configured to melt at a temperature greater than or equal to 100° F.

18. A time of arrival probe system, comprising:
- a rotor assembly comprising a plurality of blades;
- a wedge attached to a first blade of a the plurality of blades;
- a rotor casing disposed around the plurality of blades; and
- a time of arrival probe mounted to the rotor casing.

19. The time of arrival probe system of claim 18, wherein the wedge comprises an internal cavity devoid of material.

20. The time of arrival probe system of claim 18, wherein the wedge comprises an opaque material.

* * * * *